May 4, 1948.   C. R. HAGEN   2,440,770
COTTON CONVEYOR BLOWER
Filed June 29, 1944
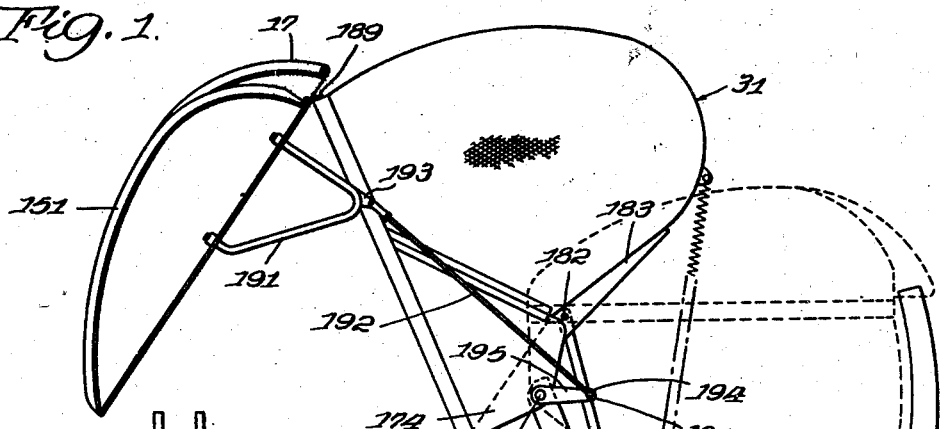
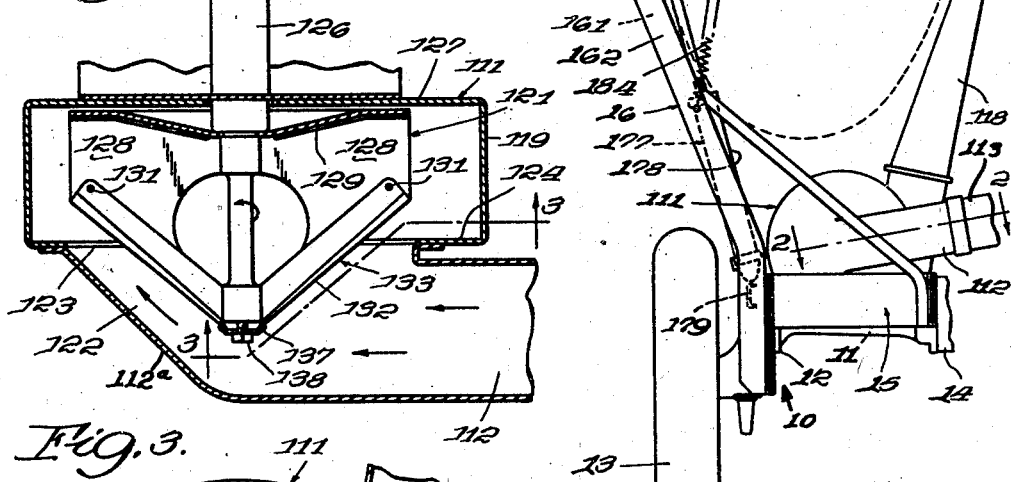
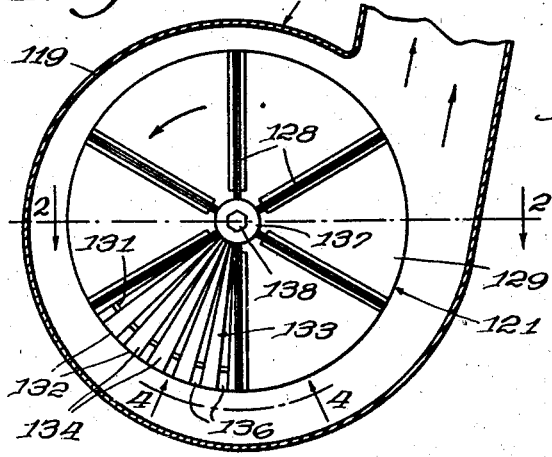
INVENTOR.
Clarence R. Hagen
BY Paul O. Pippel
Atty.

Patented May 4, 1948

2,440,770

UNITED STATES PATENT OFFICE 2,440,770

COTTON CONVEYOR BLOWER

Clarence R. Hagen, Chicago, Ill., assignor to International Harvester Company, a corporation of New Jersey Application June 29, 1944, Serial No. 542,772

2 Claims. (Cl. 302—37)

This invention has to do with a pneumatic system for the transfer of seed cotton and relates more in particular to a novel blower device by and through which the cotton-laden air is propelled.

The invention is particularly useful in a pneumatic system for conveying cotton from a mechanical cotton picking unit to a cotton receptacle transported with the unit across a field of cotton plants being harvested. A characteristic of cardinal importance in the operation of a fan or blower in such a system is that it shall not cause the cotton seeds to strike or be struck by any surface with sufficient impact to be broken or cracked thereby. When the hard impervious surfaces of seeds are ruptured the oil leaks out, making them less valuable to seed processing mills and also discoloring the cotton whereby its grade and value are lowered.

A general object of this invention is the provision of a cotton conveying blower so constructed that the cotton seeds will be treated with sufficient gentleness to avoid breaking their shells. This is accomplished by constructing the blower so the blades of its rotor are prevented from striking the cotton and the seeds.

More specific objects include the provision of:

A novel blower casing with a vestibule spaced axially from the rotor and into which the seed cotton is introduced for deflection into the main part of the casing in a zone radially outwardly from the rotor while the air is directed axially into the rotor.

A novel blower casing with an inlet spaced axially from the rotor and directed transversely of the rotor axis whereby the momentum of seed cotton entering the inlet will cause the cotton to be introduced into the rotor-containing part of the casing within a zone radially outwardly from the rotor blades.

An improved radially slotted guard upon the air entrance end of the rotor to positively exclude the seed cotton from between the fan blades. The radial slots in the guard member increase its ability to prevent accumulation of cotton fibers and lint which would tend to fill the slots and decrease the amount of air pumped by the rotor.

The above and other desirable objects inherent in and encompassed by the invention will be better understood upon reading the ensuing description with reference to the annexed drawings, wherein:

Fig. 1 is a rear elevational view illustrating the left rear traction wheel of a tractor together with the mounting adjacently thereto of a blower embodying the principles of the present invention and a receptacle for seed cotton discharged from the blower;

Fig. 2 is a horizontal sectional view taken through the blower on the line 2—2 of Figs. 1 and 3;

Fig. 3 is a vertical sectional view taken transversely through the blower at the plane indicated by the line 3—3 of Fig. 2; and Fig. 4 is a fragmentary view taken on the line 4—4 of Fig. 3 and illustrating an edge of the blower rotor and of the slotted guard member attached thereto.

The blower device generally designated 111 is shown in Fig. 1 upon the left rear portion of a tractor 10. The tractor has a left rear axle housing 11 with a depending casing 12 at its outer end for the housing of gears (not shown) which drive an axle (not shown) which in turn drives a traction wheel 13. The usual differential housing for the tractor is shown in part at 14.

The blower is supported upon a frame structure 15 mounted upon and extending rearwardly from the rear axle housing 11, this frame structure serving as a base for a standard structure 16 for supporting a cotton receptacle 31. Standard 16 comprises a pair of fore and aft spaced angle members 161 and 162. This receptacle is shown in full lines in its dumping position and in dotted lines in its filling position where a hooded portion 17 of the cover for the receptacle is disposed communicatively with the upper end of a delivery spout 118 leading upwardly from the discharge section of the blower 111.

Referring now more particularly to Figs. 2, 3, and 4, the casing for the blower can be seen to comprise a generally cylindrical wall 119 circumferentially about and radially spaced from a bladed rotor 121. A vestibule 122 of the blower is disposed between that part of the casing surrounded by the cylindrical wall 119 and the inlet 112. A circular opening 123 in the rear end wall 124 of the main part of the casing within the cylindrical wall 119 provides communication between the vestibule and the main part of the casing.

The rotor 121 is fixed for rotation with a shaft 125 rotatable within a bearing 126 carried within the front wall 127 of the casing. This rotor comprises six impeller blades 128 secured to and extending radially from the shaft 125. These blades are secured at their front edges to an end plate 129 which assists in maintaining them in their equal angular radiating relation. A circular wire rod 131 passes through rearward portions of the blades near their outer ends, and this member assists the plate 129 in maintaining the blades in the desired formation. The circular rod 131 also provides a support for radiating elements 132 of a fan guard assembly 133. Said elements 132 are folded into shape from elongated strips of sheet metal, elongated center sections of the strips forming spaced segments 134 of the conical guard assembly, while opposite edge portions of the strips from which these members 132 are formed are carried together and are perforated for receiving the rod 131; see Fig. 4. Each of the blades 128 is supplied with a pair of angle members 135 with the shorter legs of these angle members turned in opposite directions, as illustrated in Fig. 4, to complementally form a surface corresponding to the segmental surfaces 134 of the elements 132. The entire assembly is conical with the radiating slots 136 between the radial elements 132. The inner ends of the elements 132 are held against an enlarged rear end portion of the shaft 125 by a cap 137, Fig. 2, and a cap screw 138 turned into the back end of said shaft.

In the operation of the blower, the rotating rotor discharges air centrifugally against the cylindrical wall 119, the rotation of the fan being counter-clockwise as viewed from the rear in Fig. 3 so that this discharged air is impelled tangentially upwardly from the casing through the vertical outlet 118. The air thus discharged from the spaces between the fan blades is replaced by air forced by the atmosphere into a cotton picking unit (not shown) disposed forwardly of the right rear axle housing (not shown) of the tractor, and thence through a conduit 113 which communicates between said picking unit and the blower inlet 112. Those parts just referred to as not shown are clearly illustrated in copending application Serial No. 542,770, of Clarence R. Hagen and Louis E. Nickla. Of course, that air conducted through the conduit 113 into the blower is laden with seed cotton when the picking unit is being operated in a cotton field.

Inlet 112 is arranged transversely of the axis of the rotor 121 whereby the inertia of the cotton has a tendency to cause this cotton to impinge against a deflector wall 112a and thence to move radially and axially of the rotor and conical guard, through the opening 123 in the rear wall of the main part of the casing, and thence onto the cylindrical wall 119 without engaging or being struck by the fan blades and without striking the guard member or assembly other than with a glancing impact. There can be no striking of the seed cotton being picked by the fan blades 128, since the radial slots 136 in the guard assembly are too narrow for permitting cotton to enter these slots although the air entering the blower does pass through these slots into the space between the fan blades from where it is centrifugally ejected.

It is important that the seeds in the picked cotton shall not be broken or cracked by the fan blades. The seeds which are only partly broken by being cracked will lose some of their oil which discolors the cotton and thereby lowers its grade and selling price. Cracked seeds because of this loss of oil are also less valuable to cotton-seed processing mills since their yield of oil will be less. By employing the guard assembly 133, as herein illustrated, and by introducing the seed cotton into the vestibule 122 of the fan casing transversely of the rotor axis and angularly to encountered surfaces of said guard assembly, the cotton seeds are handled sufficiently gently to avoid breakage.

It has been found that by making the conical guard member or assembly 133 with the radiating slots 136, the guard member will avoid accumulating cotton fibers and lint. It can be observed in Fig. 3 that the radiating slots 136 increase in width from the center to the outer perimeter of the guard member which is a factor further increasing the difficulty with which fiber or lint particles could cling to the sides of the radiating slots 136. There must be no accumulation of foreign particles within the slots of the guard member for, if these slotted openings were closed, the fan or blower would become ineffective or its efficiency very materially reduced.

Opposite end plates 174 (of which one is shown in Fig. 1) depend from the brim of the basket portion of the receptacle, and these end plates are journaled upon opposite ends of a rod 175 carried in said uprights 161 and 162 of the standard structure. This pivotal connection between the basket and the upper ends of the standard uprights 161 and 162 normally supports the basket in the dotted line position, with a bottom portion of the basket resting upon footing braces 160 for said uprights, but allows pivoting of the receptacle to the full line position of Fig. 1.

Dumping of the receptacle is brought about by a hydraulic ram or motor 177 comprising a cylinder 178 having its lower end pivotally connected to a channel cross-piece 179 anchored to the lower ends of the standard uprights 161 and 162 and a piston rod 181 pivotally connected with the outer wall of the receptacle by means of a pin 182 anchored within a pair of fore and aft reenforcing plates 183, which are secured to the outer wall of the basket. When fluid is introduced into the lower end of the cylinder 178, a piston therein (not shown) will be forced upwardly and thereby will force the piston rod 181 upwardly for pivoting the basket into the dumping position. Normally relaxed helical springs 184 (one being shown) connected between the standards 161 and 162 and the basket, become distended when the receptacle approaches a poised position and continue to be distended when the basket reaches the over-center dumping position illustrated in solid lines, whereby these springs cause the receptacle to pivot clockwise from the dumping position toward the filling position when fluid is allowed to escape from the lower end of the motor cylinder 178. These springs continue to act upon the receptacle after it has passed the over-center position when returning to the filling position so as to accelerate the return of the basket and thereby minimize the time required for dumping.

A linkage is provided for causing the cover 151 of the receptacle to pivot about hinges 189 connecting the inner edge of this cover member with the basket brim, when the receptacle is pivoted to the dumping position. When so pivoted, the cover member is opened with respect to the basket so that the cotton is readily dumpable from the basket into a wagon box, or the like, which may be driven up alongside of the machine. The linkage for opening the cover 151 includes double legged brackets 191 secured to opposite ends of the cover member and links 192 respectively pivotally attached to ears 193 on these brackets 191 and having a sliding connection with respective pins 194 pivotally anchored in arms 195 which are fixed to opposite ends of the non-rotatable rod 175. These links 192 have heads 196 on their outer ends for abutment with the pivotal pins 194, as illustrated in Fig. 1, prior to the receptacle reaching the dumping position. Continued counter-clockwise movement of the receptacle, as viewed in Fig. 1, shortly prior to reaching the dumping position and after the links 192 can move no farther upwardly, will cause the links to pull downwardly on the ears 193 and the brackets 191 for causing the cover member to pivot about the pivot pins of its hinges 189 into the opened position. When the receptacle is returned toward the filling position, the links 192 will slide downwardly into the holes therefor in the pins 194, permitting the cover to close upon the top of the receptacle by the force of gravity.

The cover 151 of the receptacle 31 is arched between its inner and outer edges. This arched portion of the cover embodies a grille (clearly illustrated in said copending application Serial No. 542,770) which extends into the upper part of the hood 17 and hence over the upper end of the spout 118 when the receptacle is in the filling position. Cotton-laden air propelled upwardly through the spout 118 strikes the under side of the aforesaid grill which deflects the cotton into the receptacle while permitting the air and trash particles to be discharged into the atmosphere through the grille.

The blower constituting the invention has been shown with other apparatus where it has special utility, with the view of more vividly illustrating the invention. Those interested in claims directed to the apparatus collateral to the invention should refer to copending applications Serial Nos. 542,770, 542,773, and 542,774. Serial No 542,773 has matured into Patent No. 2,401,152, granted May 28, 1946.

I claim:

1. In a pneumatic system for the transfer of seed cotton, a blower comprising a bladed rotor which draws air into an inlet end thereof when rotating; a casing for said rotor, said casing including a wall extending circumferentially about the rotor in spaced relation therewith, a discharge passage communicative with the space between the rotor and said wall, a conical vestibule adjacent to the inlet end of said rotor and coaxial therewith, said conical vestibule having an open base end at least substantially as great in diameter as said rotor and disposed in opposed axially spaced relation therewith for direct communication with the space between the rotor and the circumferential wall, and a vestibule inlet passage having a transverse expanse substantially equal to the altitude of the conical vestibule and extending diametrically thereof toward an opposite inclined wall portion of the conical vestibule with an inner side of said passage adjacent to the vestibule base and an outer side coincident with the vestibule vertex whereby cotton is directed into the vestibule transversely of the rotor axis and is guided by the inclined vestibule wall portion axially of the rotor and radially outwardly thereof into the space between the rotor and the wall extending circumferentially thereabout.

2. In a pneumatic system for the transfer of seed cotton, a blower comprising a bladed rotor which draws air into an inlet end thereof when rotating; a radially slotted conical guard member of which the base is at least substantially as great in diameter as the rotor and secured coaxially to the rotor over the inlet end thereof while the apex end of such guard member projects outwardly therefrom; and a casing for said rotor and guard member, comprising a wall extending circumferentially about the rotor in radially spaced relation therewith, a discharge passage communicative with the space between the rotor and said wall, a conical vestibule coaxially about said guard member, said conical vestibule having an open base end at least substantially as great in diameter as said rotor and disposed in opposed axially spaced relation therewith for direct communication with the space between the rotor and the circumferential wall, and a vestibule inlet passage having a transverse expanse substantially equal to the altitude of the conical vestibule and extending diametrically thereof with an inner side adjacent to the vestibule base and with an outer side extending diametrically across said guard member at its apex and in spaced relation therewith axially of said guard member.

CLARENCE R. HAGEN.

REFERENCES CITED

The following references are of record in the file of this patent:

UNITED STATES PATENTS

| Number | Name | Date |
|---|---|---|
| 685,111 | Dannelly | Oct. 22, 1901 |
| 1,315,028 | Martin | Sept. 2, 1919 |
| 1,348,829 | Gabel | Aug. 3, 1920 |
| 1,604,910 | Hamner | Oct. 26, 1926 |
| 1,887,831 | Willett | Nov. 15, 1932 |
| 1,893,710 | Lykken | Jan. 10, 1933 |
| 2,225,397 | Franks | Dec. 17, 1940 |
| 2,269,520 | Crites | Jan. 13, 1942 |